Oct. 18, 1955     H. NERWIN     2,721,041
FILM CARTRIDGE FOR PHOTOGRAPHIC CAMERAS
Original Filed Sept. 23, 1952
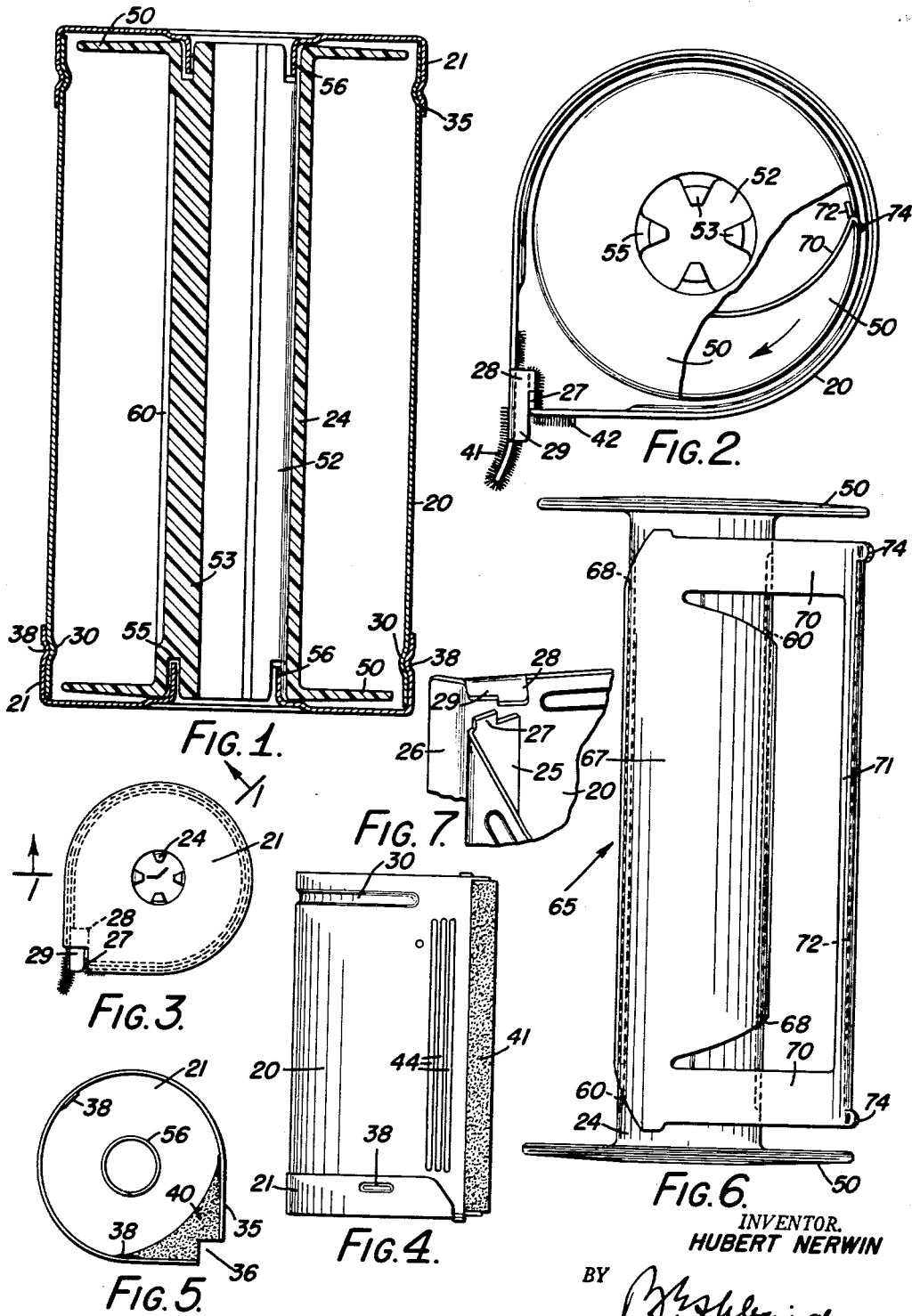
INVENTOR.
HUBERT NERWIN
BY
ATTORNEY United States Patent Office 2,721,041
Patented Oct. 18, 1955

2,721,041

FILM CARTRIDGE FOR PHOTOGRAPHIC CAMERAS

Hubert Nerwin, Irondequoit, N. Y., assignor to Graflex, Inc., Rochester, N. Y., a corporation of Delaware Original application September 23, 1952, Serial No. 311,081. Divided and this application July 27, 1953, Serial No. 370,591

5 Claims. (Cl. 242—71)

The present invention relates to a film holding cartridge for use in photographic cameras. In a more particular aspect the invention constitutes an improvement over the film cartridge of my pending U. S. patent application Serial No. 218,230, filed March 29, 1951, now Patent No. 2,662,696. The present application is a division of my pending U. S. patent application Serial No. 311,081, filed September 23, 1952.

One object of the invention is to provide a film-holding cartridge or cassette which will be light-tight and which therefore can safely be placed in or removed as a unit from a camera, even in daylight, with a new or an exposed roll of film therein.

A further object of the invention is to provide an improved film cartridge or cassette in which better sealing is obtained.

Another object of the invention is to provide a film-holding cartridge or cassette of the character described which will be light-tight so that it may serve as a package in which a roll of exposed film may safely be shipped to a point where it can be developed.

Another object of the invention is to provide a film-holding cartridge or cassette into which the lead end of a roll of film can easily and quickly be threaded, even in the dark, and which is, therefore, especially suitable for military use.

A further object of the invention is to provide a film cartridge or cassette so constructed that upon insertion of the lead end of the film into the cartridge or cassette and upon rotation of the spool of the cassette the lead end of the film will automatically be engaged by the core or spool mounted within the cartridge or cassette and will be wound upon the core or spool upon rotation thereof.

Another object of the present invention is to provide an improved film-holding cartridge or cassette of the type described containing a spool on which the film may be wound so that the film will more adequately be protected against "end-fogging" by the end flanges of the spool.

Another object of the invention is to provide a film-holding cartridge or cassette of the character described so constructed that the spool can be quickly coupled to or disconnected from the driving key or driving mechanism of a camera to permit quick insertion into the camera of a new cartridge or cassette with a new roll of film, as well as quick removal from the camera of a cartridge or cassette containing a roll on which exposed film has been wound.

Still another object of the invention is to provide a film holding cartridge of the character described which is easy to make and which can be manufactured on a production basis at a relatively low cost.

Other objects of the invention will be apparent hereinafter from the specification and from the recital of the appended claims.

In the drawing:

Fig. 1 is an axial section of a film holding cartridge made according to one embodiment of this invention;

Fig. 2 is an end view of this cartridge, with one of the caps removed, and with part of the upper flange of the spool broken away to show the film-engaging hook or clip;

Fig. 3 is an end view of the cartridge, on a somewhat reduced scale, showing the cap in position;

Fig. 4 is a side elevation of the cartridge, also on a reduced scale, and showing one cap removed therefrom;

Fig. 5 is a view on a reduced scale, looking at the inside of one of the end caps of the cartridge;

Fig. 6 is a side elevation on the scale of Fig. 1, of the spool of the cartridge, showing the film-engaging hook or clip; and Fig. 7 is a fragmentary perspective view, looking at one end of the body of the cartridge.

Referring now to the drawing by numerals of reference, 20 denotes the body portion of my cartridge, 21 are the end caps for the cartridge; and 24 is the film spool.

The body portion 20 of the cartridge is made of a thin sheet, such as aluminum, and is flexible. It has an axially extending mouth or opening for passage of film into and out of the cartridge. This mouth or opening is defined and bounded by an inturned portion 25 (Fig. 7) and by a portion 26, which is generally parallel to the portion 25, when the cartridge is closed, and which is flared somewhat outwardly at its extreme end so as to permit ready introduction of the film into the mouth of the cartridge. The lip or bounding portion 25 of the body is provided with integral lugs 27 at its opposite ends which project axially beyond the rest of the body portion of the cartridge. The lip portion 26 is provided at opposite ends with inwardly turned tabs or flanges 28. Each tab or flange 28 is cut away, as shown in Fig. 7, at 29 to provide a seat for one of the lugs 27. Near its opposite ends, the body portion 20 is crimped, as denoted at 30 (Fig. 4), to provide parallel arcuate grooves which extend around the major portion of the body.

The caps 21 of the cartridge are also made of a suitable metal, such as aluminum. The caps are made preferably identical with one another so that they may be interchangeable. Each cap 21 is generally pear-shaped in cross-section and has a skirt portion 35 around its periphery. The top of each cap is notched and the skirt portion 35 thereof is cut away, as denoted at 36 in Fig. 5, to receive a lug 27 of body 20. The skirt portion 35 of each cap is provided with three equi-angularly spaced teats 38 (Fig. 4), formed by crimping, which are adapted to engage in either of the recesses 30 of the body to hold the cap on the body portion 20.

Both caps are lined with plush 40 on their inside around the notch 36, as shown in Fig. 5. Strips of plush 41 and 42 (Fig. 2) are glued around the lips 25 and 26 of the body portion of the cartridge to further insure light-tightness of the cartridge in use. Corrugations 44 (Fig. 4) may be formed in the body portion 20 adjacent lip 26 for strength.

When the caps are pushed over the ends of the body portion the teats 38 on the caps snap into the grooves 30 of the body portion to securely hold the caps on the body portion, and the skirts 35 of the caps compress and confine the body portion. At the same time the caps force the lugs 27 of the body portion against the seats 29 (Fig. 7) formed on the flanges 28 of the body portion. Since the flanges 28 are long enough to extend under the top portions of the caps, when the caps are on the body portion, as shown in Fig. 3, and since the caps hold the lugs 27 against the seats 29 of the flanges, the caps insure light-tightness of the cartridges.

As previously stated the cartridge is adaped to contain and support a spool 24. The spool 24 is formed with integral end flanges 50 at opposite ends. It has a bore 52 (Fig. 1) extending through it that is generally cross-shaped in cross-section, as shown in Fig. 2, the spool being provided with four internally projecting splines 53 which bound and shape its bore. The splines 53 of the spool are formed with circular recesses or grooves 55, as shown in Figs. 1 and 2; and each cap 21 has a central circular opening which is bounded by a central circular flange 56 that is engageable in one of the end recesses 55 of the spool. The flanges 56 are concentric with the bore of the spool; and they serve as bearings on which the spool rotates and also as light-traps for the spools.

Because of the central openings in the caps and because of the bore 52, the spool is accessible from either end and can be engaged at either end with the driving key of the camera in which the cartridge is being used; and because the bore 52 is cruciform in cross section the key can be engaged with the bore in different positions at 90° apart. All this permits of quickly engaging the driving key of the camera with the spool when the cassette is inserted in the camera.

The spool is formed on its periphery with a plurality of axially extending recesses or grooves 60 of which only two are shown in Fig. 6. A very thin hook member 65 (Fig. 6) made of annealed strip spring steel, for instance, is adapted to be secured to the spool. This clip or hook member 65 is stamped to provide a body portion 67 which is formed with a slightly smaller radius than the radius of the periphery of the spool 52 and which has inturned portions 68 that may be engaged in any two diametrically-opposed grooves 60 of the spool. When the hook or clip member 65 is snapped over the periphery of the spool, it will be held, therefore, resiliently in clamping engagement with the periphery of the spool by the inturned portions 68.

In the stamping operation in forming the hook member, there are two parallel arms 70 stamped out integral with the body portion 67 of the hook member. These are joined together at their free ends by an integral connecting strip 71. The strip 71 has an inturned portion 72 which is adapted to engage in one of the grooves 60 of the periphery of the spool.

In forming the hook member the arms 70 are shaped normally to extend on an arc of larger radius than the body portion 67 of the hook member, so that the arms 70 extend normally resiliently away from body portion 65. When film is wrapped around the hook member, however, the arms 70 are pressed against the spool so that the turned-in portion 72 thereof engages in a recess 60 of the spool. The hook member from one inturned portion 68 to the other is adapted to embrace in resilient clamping engagement approximately 180° of the periphery of the circumference of the spool; and the hook member between inturned portion 72 and the distal inturned portion 68 embraces, when the arms 70 are pressed against the spool by film wound over the arms, the hook member embraces an arc equal to substantially three-fourths of the circumference of the spool. The arms 70 have out-turned hooks 74 formed on them adjacent opposite ends of the hook member which are spaced apart a distance equal to the distance between the two rows of perforations in the film which is used in the camera for which the film cartridge is adapted. For a more detailed description of the structures of the spool and of the hook member reference is made to pending U. S. patent application Serial No. 311,081, filed September 23, 1952 above mentioned.

In use, it is easy to quickly assemble the cartridge. The body portion 67 of the hook member can quickly be snapped into engagement with the spool. Then one end of the spool is seated on the flange 56 of one of the caps 21, which may already have been assembled on the body portion 20 of the cartridge. Then the other cap 21 is shoved on the body portion 20 of the cartridge, seating its flange 56 in the other circular groove 55 of the spool.

When the spool in the cartridge is to be used as a take-up spool in a camera, the cartridge is positioned in the camera and the driving key or other driving mechanism is engaged in one end of the bore 52 of the spool. Then the lead end of the film from the supply spool or cartridge of the camera is inserted through the mouth of the body portion of the cartridge, and the spool is rotated clockwise by the key or other driving mechanism of the camera so as to bring the hooks 74 into engagement with perforations in the film. As the film winds on the camera, the hook member is depressed. After a sufficient amount of film has been wound on the take-up spool to bring an unexposed portion of the film into picture taking position a picture can be taken. After taking a picture, the film is further wound by rotating the spool in the usual manner. The film winding on the spool wraps over and around the hook member.

After all of the film has been exposed, the whole cartridge can be removed from the camera, and a new cartridge positioned therein, or the cartridge, which has previously been used as the supply cartridge, can be shifted to the take-up position in the camera and a new cartridge loaded with film can be introduced into the supply position in the camera. The cartridge with the exposed film therein is light-tight and provides a ready case for keeping or shipping the film until it can be developed. To remove the spool with the exposed film thereon from the cartridge all that is necessary to do is to remove one of the caps 21 and lift the spool out. This can be done readily in the dark. A new spool with unexposed film thereon can just as readily be placed in the cartridge in the dark, and the cap, which has been removed, can then readily be replaced.

The cartridge or casette of the present invention has definite advantages for both military and civilian purposes because it permits daylight loading and unloading of the camera in the field due to the light-tight protection of the film. Further, when a roll of exposed film has been wound on the spool in the cartridge, the film is securely protected, and can safely be sent to a developing point. Furthermore, with the present cartridge it is not necessary to provide film with a long leader or a long trailer. This reduces winding time, both before and after exposure, to a minimum; the camera is ready for picture taking almost by loading it with the cartridge. Moreover, the film spool is designed so that it can be engaged on either end with the driving key of the camera for rotation in either direction. The cartridge, however, has to be inserted in the camera in the proper direction to have the film properly in the exposure opening.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A roll film cartridge for photographic cameras comprising a casing which is made of a resilient material and which is open at both ends and also along one side, said casing having two lip portions at opposite sides, respectively, of said side opening and extending along said side opening for the full length thereof to form a mouth through which film may be introduced into or fed out of said casing, one of said lip portions having lugs of less width than said one lip portion projecting axially at opposite ends thereof, the other of said lip portions having flanges at its opposite ends bent inwardly toward the other lip portion and against which said lugs are adapted to seat, and a pair of removable end caps closing opposite ends of said casing, each of said end caps having a peripheral flange to engage around the periphery of said casing to compress the same and force said lugs against said seats to render said cartridge light-tight at its ends when the caps are in position, and both said lip portions being covered with a compressible material which renders said cartridge light-tight along its length when said caps are in position.

2. A roll film cartridge for photographic cameras comprising a casing which is made of a resilient material, said casing being open at both ends and also along one side, said casing having two lip portions at opposite sides, respectively, of said side opening and extending along said side opening for the full length thereof to form a mouth through which film may be introduced into or fed out of said casing, one of said lip portions being bent inwardly of the casing to form a flange bounding said mouth which is generally parallel to the other lip portion, one of said lip portions having a lug projecting axially at each end which is of less width than said one lip portion, and the other lip portion having a flange at each end bent inwardly perpendicularly toward the other lip portion, each flange having a seating portion against which the adjacent lug is adapted to seat, and each flange having a tab extending inwardly beyond said seating portion and overlying the adjacent end of said other lip, and a pair of removable end caps closing opposite ends of said casing, each of said end caps having a peripheral flange to engage around the periphery of said casing to compress the same and force said lugs against said seating portions, said caps having openings which register with said mouth when the caps are in position and which receive said lugs, said seating portions extending under said caps to render said cartridge light-tight at its ends when the caps are in position, and both said lip portions being covered with a compressible material which renders said cartridge light-tight along its length when said caps are in position.

3. A roll film cartridge for photographic cameras comprising a casing which is made of a resilient material, said casing being open at both ends and also along one side, said casing having two lip portions at opposite sides, respectively, of said side opening and extending along said side opening for the full length thereof to form a mouth through which film may be introduced into or fed out of said casing, one of said lip portions being bent inwardly of the casing to form a flange bounding said mouth which is generally parallel to the other lip portion, said one lip portion having a lug projecting axially at each end which is of less width than said one lip portion, the other lip portion having a flange at each end bent inwardly toward said one lip portion, each flange having a seating portion against which the adjacent lug is adapted to seat, and each flange having a tab extending inwardly beyond its seating portion and overlying the adjacent end of said other lip, and a pair of removable end caps closing opposite ends of said casing, each of said end caps having a peripheral flange to engage around the periphery of said casing to compress the same and force said lugs against said seating portions, said caps having openings which register with said mouth when the caps are in position and which receive said lugs, said seating portions extending under said caps and said caps being lined with a compressible material to render said cartridge light-tight at its ends when the caps are in position, both said lip portions being covered with a compressible material which renders said cartridge light-tight along its length when said caps are in position, each of said caps having an annular flange disposed radially inside its peripheral flange and extending axially inwardly into the casing when the caps are in position, and a film holder rotatably mounted in said casing on said annular flanges.

4. A roll film cartridge for photographic cameras comprising a housing having an axially extending slot therein through which film may be introduced into and fed out of said housing, said housing being closed except for said slot, a spool rotatably supported in said housing, and a resilient film-engaging member, said film-engaging member having a resilient gripping portion normally curved on an arc that has a smaller radius than the radius of the peripheral surface of said spool, whereby said member may be snapped over said spool and resiliently clamped on said spool, and said film-engaging member having an integral arm normally projecting resiliently outwardly away from the periphery of said spool, said arm carrying a hook at its free end which is resiliently held by said arm normally in close proximity to the inside wall of said housing so that it is in position to engage a perforation in the lead end of a strip of film after said lead end has been introduced through said slot into said housing and said spool has been rotated to bring said hook into engagement with said perforation.

5. A roll film cartridge for photographic cameras comprising a housing having an axially extending slot therein through which film may be introduced into and fed out of said housing, said housing being closed except for said slot, a spool rotatably supported in said housing and a resilient film-engaging member resiliently clamped on said spool, said spool having at least three angularly-spaced recesses around its periphery, said film-engaging member being made of thin, resilient material and having a gripping portion normally curved on an arc that has a smaller radius than the radius of the peripheral surface of said spool, said gripping portion having at least two angularly-spaced inturned portions whereby said film-engaging member may be snapped over the periphery of said spool with its two inturned portions engaged in said recesses, and said film-engaging member having an integral arm normally curved on an arc of greater radius than its gripping portion, said arm having an inturned portion that is adapted to engage in a third of said recesses and carrying a hook which is normally resiliently held by said arm in close proximity to the inside wall of said housing so that it is in position to engage a perforation in the lead end of a strip of film after said lead end has been introduced through said slot into said housing and said spool has been rotated to bring said hook into engagement with said perforation.

References Cited in the file of this patent

UNITED STATES PATENTS

| | | |
|---|---|---|
| 620,777 | Hoskin | Mar. 7, 1899 |
| 1,164,835 | Mandel | Dec. 21, 1915 |
| 1,899,279 | Lessler | Feb. 28, 1933 |
| 2,172,255 | Nagel | Sept. 5, 1939 |
| 2,423,663 | Roehrl | July 8, 1947 |
| 2,487,479 | Roehrl | Nov. 8, 1949 |
| 2,616,634 | Melkon | Nov. 4, 1952 |